(12) United States Patent
Sun

(10) Patent No.: US 8,778,821 B2
(45) Date of Patent: Jul. 15, 2014

(54) OPTICAL GLASS AND OPTICAL ELEMENT

(71) Applicant: CDGM Glass Co., Ltd., Chengdu (CN)

(72) Inventor: Wei Sun, Chengdu (CN)

(73) Assignee: CDGM Glass Co., Ltd., Chengdu, Sichuan (CN)

( * ) Notice: Subject to any disclaimer, the term of this patent is extended or adjusted under 35 U.S.C. 154(b) by 0 days.

(21) Appl. No.: 13/639,052

(22) Filed: Oct. 2, 2012

(65) Prior Publication Data

US 2013/0190162 A1 Jul. 25, 2013

Related U.S. Application Data

(63) Continuation-in-part of application No. PCT/CN2011/072840, filed on Oct. 27, 2011.

(30) Foreign Application Priority Data

Apr. 19, 2010 (CN) .......................... 2010 1 0151999

(51) Int. Cl.
*C03C 3/066* (2006.01)
*C03C 3/068* (2006.01)

(52) U.S. Cl.
CPC ................. *C03C 3/068* (2013.01); *C03C 3/066* (2013.01)
USPC .............................................. 501/78; 501/79

(58) Field of Classification Search
CPC ................................ C03C 3/066; C03C 3/068
USPC ...................................................... 501/78, 79
See application file for complete search history.

(56) References Cited

U.S. PATENT DOCUMENTS

| | | | |
|---|---|---|---|
| 8,110,515 B2 * | 2/2012 | Shimizu | .......................... 501/78 |
| 2009/0069162 A1 | 3/2009 | Shimizu | |
| 2009/0131240 A1 | 5/2009 | Shimizu | |

FOREIGN PATENT DOCUMENTS

| | | |
|---|---|---|
| CN | 101805120 A1 | 8/2010 |
| JP | 2001130924 A1 | 5/2001 |

OTHER PUBLICATIONS

PCT/CN2011/072840, International Search Report, Apr. 19, 2010.

* cited by examiner

*Primary Examiner* — Karl Group
(74) *Attorney, Agent, or Firm* — Caesar, Rivise, Bernstein, Cohen & Pokotilow, Ltd.

(57) ABSTRACT

The invention discloses an optical glass and an optical element. The optical glass comprises 0.1 wt % -8 wt % of $SiO_2$, 20 wt % -32 wt % of $B_2O_3$, 20 wt % -35 wt % of $La_2O_3$, 15 wt % -30 wt % of $Gd_2O_3$, 1-6 wt % of $Ta_2O_5$, 1 wt % -15 wt % of ZnO, and 0.1 wt % -2 wt % of $Li_2O$. The optical glass claimed in the invention has a refractive index of 1.75-1.8, an Abbe number of 45-52, a transformation temperature of less than 610° C., and a wavelength of less than 390 nm at 80% transmittance. Thus the claimed optical glass meets the requirements for a modern imaging device.

14 Claims, No Drawings

OPTICAL GLASS AND OPTICAL ELEMENT

BACKGROUND OF THE INVENTION

1. Field of Invention

This invention relates to the technical field of glass, more specifically, an optical glass and an optical element.

2. Description of Related Art

In recent years, digital cameras, digital video cameras and camera-enabled mobile phones are increasingly popular. The equipment used for the optical system is highly integrated and increasingly multi-functional. Thus it is imperative that the optical system is higher fidelity, lighter weight and small size. Therefore, aspherical mirrors are widely used. At the same time, spherical elements have become the mainstay in optical design.

Precision mold pressing technology is widely used in the manufacture of aspherical lens. Precision mold pressing refers to a technique in which a prefabricated glass component is pressed at a given temperature and pressure using a high precision mold of the shape of a product. The technique is capable of producing glass products that are or nearly are the shape of the final products and with optically functional surfaces. No burnishing by abrasion is required for the aspherical lens made by the precision mold pressing technique, thus the working procedure are simplified.

The optical glass for the aspherical lens is required to have a high refractive index and a low dispersive index, and is more widely used for modern imaging devices. For example, Chinese patent CN101360691A discloses an optical glass with optical parameters including refractive index of 1.5-1.65 and Abbe number of 50-65. Chinese patent CN1704369A discloses optical glass with optical parameters including refractive index of 1.85-1.90 and Abbe number of 40-42.

Refractive index has a significant impact on light transmittance of the optical glass: the higher the refractive index, the lower the light transmittance. Fox example, Chinese patent CN101492247A discloses an optical glass with a refractive index of 1.8-2.1, and a corresponding wavelength of above 400 nm at 80% transmittance.

During precision compression molding, in order to replicate the high precision molding surface onto the glass molding products, it is necessary to shape a prefabricated glass body by pressure at about the temperature of the softening point of the glass. During the process, a forming die is exposed to high temperature and higher pressure. Even though it is in a protective gas, the surface of the forming die is susceptible to oxidation and corrosion. Therefore, it is desirable that the glass has a lower transformation temperature. In prior art, Chinese patent 1704369A discloses an optical glass with optical parameters including refractive index of 1.83-1.9, Abbe number of 40-42, and transformation temperature of 670-720° C. Due to the high transformation temperature of the glass material, high temperature is necessary during precision compression molding. Thus the forming die is easy to be damaged resulting in high cost.

All references cited herein are incorporated herein by reference in their entireties.

BRIEF SUMMARY OF THE INVENTION

Therefore, the technical problem to be solved in this invention is to provide an optical glass and an optical element. The optical glass according to the invention is provided with refractive index of 1.75-1.8, Abbe number of 45-52, transformation temperature less than 610° C., and a corresponding wavelength less than 390 nm at 80% transmittance.

The invention provides an optical glass comprising:
0.1 wt %-8 wt % of $SiO_2$;
20 wt %-32 wt % of $B_2O_3$;
20 wt %-35 wt % of $La_2O_3$;
15 wt %-30 wt % of $Gd_2O_3$;
1 wt %-6 wt % of $Ta_2O_5$;
1 wt %-15 wt % of ZnO;
0.1 wt %-2 wt % of $Li_2O$.
Preferably, comprising:
0.1 wt % to 4 wt % (less than 4 wt %) of $SiO_2$
Preferably, further comprising:
0-8 wt % of $ZrO_2$,
0-5 wt % of $Nb_2O_5$,
0-5 wt % of $Y_2O_3$,
0-5 wt % of $Yb_2O_3$,
one or more of BaO, CaO, SrO, $Na_2O$, $K_2O$
and 0-0.5 wt % of $Sb_2O_3$,
wherein, the total content of BaO, CaO and SrO is 0-15 wt %,
and the total content of $Na_2O$ and $K_2O$ is 0-2 wt %.
Preferably, comprising:
1 wt %~10 wt % of BaO, CaO and SrO in total content;
0.1 wt %~1 wt % of $Na_2O$ and $K_2O$ in total content;
Preferably, comprising:
1 wt %-7 wt % of $ZrO_2$.
Preferably, comprising:
0.1 wt %-3.5 wt % of $SiO_2$.
Preferably, comprising:
22 wt %-32 wt % of $B_2O_3$.
Preferably, comprising:
25 wt %-35 wt % of $La_2O_3$.
Preferably, comprising:
18 wt %-25 wt % of $Gd_2O_3$.
Preferably, comprising:
2 wt %-5 wt % of $Ta_2O_5$.
Preferably, comprising:
5 wt %-12 wt % of ZnO.
Preferably, comprising:
0.3 wt %-1.5 wt % of $Li_2O$.
Preferably, comprising:
2.5 wt %-3.5 wt % of $SiO_2$.
Preferably, the refractive index is 1.75-1.8;
The Abbe number is 45-52;
The transformation temperature is less than 610° C.;
When transmittance is 80%, the corresponding wavelength is less than 390 nm.

The invention further provides an optical element comprising the optical glass described herein.

The invention provides an optical glass and an optical element. The optical glass comprises the following: 0.1 wt %-8 wt % of $SiO_2$, 20 wt %-32 wt % of $B_2O_3$, 20 wt %-35 wt % of $La_2O_3$, 15 wt %-30 wt % of $Gd_2O_3$, 1 wt %-6 wt % of $Ta_2O_5$, 1 wt %-15 wt % of ZnO and 0.1 wt %-2 wt % of $Li_2O$. $SiO_2$ is used to resist devitrification in the glass, and as a grid component of the glass. As an oxide, $B_2O_3$ improves the heat stability and chemical stability of the glass, and reduces the softening temperature and kinetic viscosity of the glass. $La_2O_3$ and $Gd_2O_3$ are necessary for a high refractive index and a low dispersive index. $Ta_2O_5$ is a component for providing high refractive index and low dispersive index of the glass, and is available to effectively reinforce the stability of the glass. ZnO is a component for providing high refractive index and low dispersive index of the glass. $Li_2O$, a strong dissolution aid, reduces the softening temperature of the glass. An experimental result shows that such optical glass according to the invention is provided with a refractive index of 1.75-1.8, an Abbe number of 45-52, and a transformation temperature of less than 610° C., and a corresponding wavelength of less than 390 nm at 80% transmittance.

DETAILED DESCRIPTION OF PREFERRED EMBODIMENTS

The following is a description of the technical method used in the embodiments according to the invention. It is obvious that the embodiments provided herein are only some embodiments according to the invention but not all embodiments. All other embodiments obtained by the common technician of the field without creative work based on the embodiments provided herein will fall into the protective scope of the invention.

The invention provides an optical glass comprising the following:

0.1 wt %-8 wt % of $SiO_2$;
20 wt %-32 wt % of $B_2O_3$;
20 wt %-35 wt % of $La_2O_3$;
15 wt %-30 wt % of $Gd_2O_3$;
1 wt %-6 wt % of $Ta_2O_5$;
1 wt %-15 wt % of ZnO;
0.1 wt %-2 wt % of $Li_2O$ $SiO_2$ is an important oxide for manufacturing glass. The irregular continuous network formed by the structural unit of silica tetrahedron ($SiO_4$) provides the backbone of the optical glass. $SiO_2$ resists devitrification in the glass. When $SiO_2$ is more than 8 wt %, the optical glass is reduced in meltability and is increased in softening temperature. The $SiO_2$ content is limited to 0.1 wt %-8 wt %, preferably 0.1 wt % to 4 wt % (less than 4 wt %), more preferably 0.1 wt %-3.5 wt % and optimally 2.5 wt %-3.5 wt %.

$B_2O_3$ is an important oxide for manufacturing optical glass, effective to form the grid of the optical glass, reduces the expansion coefficient of the glass, and improves heat stability and chemical stability of the glass, increases refractive index of the glass, and reduces transformation temperature and fusible temperature. $B_2O_3$ content is limited to 20 wt %-32 wt %. When the $B_2O_3$ content is less than 20 wt %, the transformation temperature rises, and the refractive index falls. When the $B_2O_3$ content is more than 32 wt %, the low dispersibility of the optical glass will be damaged. The $B_2O_3$ content is preferably 22 wt %-32 wt % and more preferably 25 wt %-29 wt %.

$La_2O_3$ is a necessary component for providing high refractive index and low dispersive index of the glass. $La_2O_3$ content is limited to 20 wt %-35 wt %. The refractive index decrease when the $La_2O_3$ content is less than 20 wt %. Resistance against devitrification is reduced when the $La_2O_3$ content is more than 35 wt %. The $La_2O_3$ content is preferably 25 wt %-35 wt %.

$Gd_2O_3$ is an effective component for improving refractive index of the glass and Abbe number. $Gd_2O_3$ content is limited to 15 wt %-30 wt %. Resistance against devitrification is reduced when the $Gd_2O_3$ content is more than 30 wt %. The $Gd_2O_3$ content is preferably 18 wt %-25 wt %.

$Ta_2O_5$ provides high refractive index, low dispersive index, and enforcement for stability of the glass. When $Ta_2O_5$ content is more than 6 wt %, meltability is reduced and transformation temperature is increased. The $Ta_2O_5$ content is limited to be 1 wt %-6 wt % and preferably 2 wt %-5 wt %.

ZnO is an important component for manufacturing the optical glass and for a low melting point. ZnO can reduce thermal expansion coefficient, and improve chemical stability, heat stability and refractive index of the glass. ZnO content is limited to be 1 wt %-15 wt %. Resistance against devitrification is increased when the ZnO content is more than 15 wt %. Transformation temperature is increased when the ZnO content is less than 1 wt %. The ZnO content is preferably 5 wt %-12 wt % and more preferably 8 wt %-12 wt %.

$Li_2O$ is a strong dissolution agent, and reduces the softening temperature of glass. $Li_2O$ content is limited to 0.1 wt %-2 wt %. When $Li_2O$ content is over 2 wt %, resistance against devitrification and refractive index are reduced, and crystallization and devitrification are accelerated. When the $Li_2O$ content is less than 0.1 wt %, transformation temperature and softening temperature are not lowered. The $Li_2O$ content is preferably 0.3 wt %-1.5 wt %.

The optical glass, according to this invention, further comprises 0-8 wt % of $ZrO_2$, 0-5 wt % of $Nb_2O_5$, 0-5 wt % of $Y_2O_3$, 0-5 wt % of $Yb_2O_3$, and one or more of BaO, CaO, SrO, $Na_2O$, $K_2O$ and 0-0.5 wt % of $Sb_2O_3$, wherein, the total content of BaO, CaO and SrO is 0-15 wt %, and the total content of $Na_2O$ and $K_2O$ is 0-2 wt %.

$ZrO_2$ can increase viscosity, hardness, elasticity, refractive index and chemical stability. $ZrO_2$ can reduce thermal expansion coefficient of the glass. When $ZrO_2$ content is more than 8 wt %, crystallization happens, and resistance against devitrification and transformation temperature are reduced. The $ZrO_2$ content may be 1 wt %-7 wt %.

$Nb_2O_5$ is a component for providing high refractive index of the glass and improving devitrification resistance of the glass. When $Nb_2O_5$ content is more than 5 wt %, the dispersive index is greatly raised, Abbe number is reduced and the transmissivity of the glass at a short wave is reduced. The $Nb_2O_5$ content may be 0.5 wt %-5 wt %.

$Y_2O_3$ and $Yb_2O_3$ can improve refractive index of the optical glass. $Y_2O_3$ is the component for adjusting the optical constants of the glass. When $Y_2O_3$ content is more than 5 wt %, the glass is deteriorated in the devitrification resistance. The function of $Yb_2O_3$ is similar to that of $Y_2O_3$ in the optical glass. When $Yb_2O_3$ content is more than 5 wt %, the optical glass is easy to be devitrified. The $Y_2O_3$ content may be 0.1 wt %-5 wt % or 0.5 wt %-4 wt % and the $Yb_2O_3$ content may be 0.1 wt %-5 wt % or 0.5 wt %-4 wt %.

BaO can reduce dispersion of the glass, and improve transmissivity of the glass, refractive index, density, gloss, and chemical stability of the optical glass. CaO is similar to BaO in the effect in the glass, while SrO is similar to BaO and CaO. Replacement of some BaO with SrO may quicken melting and clarification, reduce crystallization, increase refractive index, and improve devitrification resistance of the glass. The total content of BaO, CaO and SrO may be 0.5 wt %-15 wt % or 1 wt %-10 wt %.

$Na_2O$ and $K_2O$ can reduce transformation temperature of the glass. When total content of $Na_2O$ and $K_2O$ is more than 2 wt %, devitrification resistance and refractive index are reduced. The total content of $Na_2O$ and $K_2O$ may be 0.1 wt %-2 wt %, or 0.1 wt %-1 wt %.

$Sb_2O_3$ can effectively reduce clarification temperature and improve refractive index of the glass. $Sb_2O_3$ content may be 0-0.5 wt % and preferably 0.01 wt %-0.5 wt %.

The optical glass according to the invention is provided with refractive index of 1.75-1.8, Abbe number of 45-52 and transformation temperature less than 610° C.; and when transmittance is 80%, the corresponding wavelength is less than 390 nm, preferably less than 385 nm, and more preferably less than 380 nm.

The invention further provides an optical element comprising the optical glass provided herein. The optical element according to the invention comprises the optical glass according to the invention. Thus the optical element has various characteristics of the above optical glass. The optical element according to the invention is provided with refractive index of 1.75-1.8, Abbe number of 45-52 and transformation temperature less than 610° C.; and when transmittance is 80%, the corresponding wavelength is less than 390 nm. The optical element according to the invention is applicable for digital cameras, digital video cameras and camera-enabled mobiles, etc.

The preferred embodiments in the invention are described below through detailed embodiments to further illustrate the technical solution of the invention. It should be understood that these embodiments are only used for further description of the characteristics and advantages of the invention, instead of limiting the claims of the invention.

Embodiment 1

The optical glass comprises 3.5 wt % of $SiO_2$, 27.9 wt % of $B_2O_3$, 32.6 wt % of $La_2O_3$, 21.9 wt % of $Gd_2O_3$, 1.6 wt % of $Ta_2O_5$, 12.2 wt % of ZnO, and 0.3 wt % of $Li_2O$. Main performance parameters are given below:
Refractive index: nd=1.76821
Abbe number: vd=49.31
Transformation temperature: Tg=605° C.
Softening temperature: Ts=648° C.

The above performance parameters are tested using the following methods:

Annealing value in the case of refractive index (nd) of (−2° C./h)-(−6° C./h), refractive index and the Abbe number are tested in accordance with GB/T 7962.1-1987 *Colorless Optical Glass Test Methods: Refractive Index and Abbe Number.* transformation temperature (Tg) is tested in accordance with GB/T7962.16-1987 *Colorless Optical Glass Test Methods: Linear Thermal Expansion Coefficient, Transformation Temperature and Sagging Temperature*, i.e. the temperature corresponding to the point of intersection between the extended straight lines in a low-temperature area and a high-temperature area on the expansion curve of the tested sample during each temperature rise of 1° C. within a certain temperature range.

The glass is prepared into 10 mm±0.1 mm thick sample, the wavelength $\lambda_{80}$ corresponding to when the transmittance of the glass is 80% is measured.

Tables 1 and Table 2 show the component content and corresponding performance of the optical glass according to Embodiments 2-13. Table 3 shows the component content and corresponding performance of the optical glass according to comparative embodiments 1-3.

$\lambda_{80}$: 382.9 nm

TABLE 1

Component content and corresponding performance of the optical glass according to Embodiments 2-7

| | | Embodiment | | | | | |
|---|---|---|---|---|---|---|---|
| | | 2 | 3 | 4 | 5 | 6 | 7 |
| Glass component (wt %) | $SiO_2$ | 2.5 | 5 | 3 | 3.5 | 4.8 | 2 |
| | $B_2O_3$ | 28.5 | 28.8 | 27.1 | 28.5 | 27.8 | 29.2 |
| | $La_2O_3$ | 29.5 | 29.5 | 29.9 | 28.7 | 30.1 | 26 |
| | $Gd_2O_3$ | 20.3 | 21.5 | 20.5 | 23.1 | 20.3 | 23 |
| | ZnO | 10.2 | 10.2 | 10 | 10.2 | 11.8 | 9.4 |
| | $Li_2O$ | 0.8 | 0.8 | 1 | 0.6 | 1 | 1.4 |
| | $Ta_2O_5$ | 3.1 | 4.2 | 3.5 | 2.5 | 4.2 | 3.5 |
| | $ZrO_2$ | 5.1 | | 5 | 2.9 | | 5.5 |
| | Total | 100 | 100 | 100 | 100 | 100 | 100 |
| | nd | 1.76547 | 1.76825 | 1.76760 | 1.76852 | 1.77325 | 1.78125 |
| | vd | 49.51 | 49.09 | 48.65 | 49.25 | 49.7 | 49.06 |
| | Tg (C) | 603 | 605 | 609 | 606 | 608 | 596 |
| | $\lambda_{80}$(nm) | 384 | 380 | 379 | 386 | 378 | 388 |

TABLE 2

Component content and corresponding performance of the optical glass according to Embodiments 8-13

| | | Embodiment | | | | | |
|---|---|---|---|---|---|---|---|
| | | 8 | 9 | 10 | 11 | 12 | 13 |
| Glass component (wt %) | $SiO_2$ | 8 | 6 | 3.2 | 4.5 | 7 | 2 |
| | $B_2O_3$ | 31 | 29 | 27 | 22.9 | 24 | 30 |
| | $La_2O_3$ | 24.5 | 30 | 25 | 34 | 27.3 | 27 |
| | $Gd_2O_3$ | 20 | 19 | 28 | 17 | 24 | 18 |
| | ZnO | 8 | 7 | 8 | 5 | 2 | 4 |
| | $Li_2O$ | 0.5 | 1 | 0.8 | 0.6 | 0.7 | 1.55 |
| | $ZrO_2$ | 8 | 5 | | 6 | 5 | 4 |
| | $Ta_2O_5$ | | 3 | 5 | | 2 | 3 |
| | $Nb_2O_5$ | | | 3 | 4 | 1 | 2 |
| | $Y_2O_3$ | | | | 3 | 2 | 2 |
| | $Yb_2O_3$ | | | | 3 | 2 | 2 |
| | BaO | | | | | 1 | 1.2 |
| | CaO | | | | | 1 | 1.2 |

TABLE 2-continued

Component content and corresponding performance of the
optical glass according to Embodiments 8-13

| | | Embodiment | | | | | |
|---|---|---|---|---|---|---|---|
| | | 8 | 9 | 10 | 11 | 12 | 13 |
| | SrO | | | | | 1 | 1.2 |
| | Na$_2$O | | | | | | 0.4 |
| | K$_2$O | | | | | | 0.4 |
| | Sb$_2$O$_3$ | | | | | | 0.05 |
| | Total | 100 | 100 | 100 | 100 | 100 | 100 |
| | nd | 1.75438 | 1.777682 | 1.78625 | 1.76782 | 1.77325 | 1.79125 |
| | vd | 46.51 | 49.09 | 50.65 | 49.25 | 47.7 | 50.06 |
| | Tg (° C.) | 603 | 605 | 609 | 606 | 608 | 590 |
| | $\lambda_{80}$(nm) | 387 | 386 | 379 | 388 | 382 | 384 |

TABLE 3

Component content and corresponding performance of the optical
glass according to comparative embodiments 1-3

| | | Comparative embodiments | | |
|---|---|---|---|---|
| | | 1 | 2 | 3 |
| Glass | SiO$_2$ | 13 | 5 | 7.3 |
| component | B$_2$O$_3$ | 17 | 41.4 | 31.1 |
| (wt %) | La$_2$O$_3$ | 33.7 | 17.5 | 34.9 |
| | Gd$_2$O$_3$ | 25.3 | 23.5 | 25.5 |
| | ZnO | 10.2 | 11.8 | 0.2 |
| | Li$_2$O | 0.8 | 0.8 | 1 |
| | Total | 100 | 100 | 100 |
| | nd | 1.62124 | 1.60235 | 1.70123 |
| | vd | 43.51 | 48.01 | 46.37 |
| | Tg (° C.) | 732 | 622 | 712 |
| | $\lambda_{80}$ (nm) | 395 | 396 | 391 |

There are no special limitations to the preparation method for the optical glass according to the invention. The optical glass may be prepared by use of the method known to the skilled person in the art. The raw materials are melted, cooled, clarified, homogenized, and cooled. The material is then injected into the preheated metal die. The optical glass is obtained after annealing.

The optical glass according to the embodiments 1-13 and comparative embodiments 1-3 of the invention is prepared with the following processes:

Measure out an amount of each of quartz sand, boric acid, lanthanide oxide, gadolinium oxide, zinc oxide, zirconium oxide, lithium carbonate and tantalum oxide. Mix them fully and transfer to a platinum crucible. Melt at 1080-1380° C. followed by clarification, homogenization, and cooling.

Inject the melted glass into the preheated metal die at about 550-600° C.

Put the preheated metal die containing the melted glass into an annealing furnace for annealing to obtain the optical glass. Test the relevant parameters of the optical glass. The optical glass according to the embodiments 1-13 is not crystallized and devitrified during profiling.

Table 1 and Table 2 show the refractive index, Abbe number, transformation temperature and transmittance of the optical glass according to the embodiments 2-13. Table 3 shows the refractive index, Abbe number, transformation temperature and transmittance of the optical glass according to the comparative embodiments 1-3.

It can be seen from the above embodiments that the optical glass and optical element according to the embodiments of the invention have refractive index of 1.75-1.8, Abbe number of 45-52 and transformation temperature of less than 610° C., and when transmittance is 80%, the corresponding wavelength is less than 390 nm. The optical glass thus meets the requirements for a modern imaging device.

Based on the above description for the disclosed embodiments, the technician in the field can achieve or use the invention. Various modifications of these embodiments are obvious for the technician in the field. The general principle defined herein can be practiced in other embodiments without departing from the spirit or scope of the invention. Therefore, the invention is not limited to the embodiments provided herein but fall into the widest scope corresponding to the principle and novel characteristic disclosed in the invention.

What is claimed is:

1. An optical glass comprising
0.1 wt % to less than 4 wt % of SiO$_2$,
20 wt % -32 wt % of B$_2$O$_3$,
20 wt % -35 wt % of La$_2$O$_3$,
15 wt % -30 wt % of Gd$_2$O$_3$,
1 wt % -6 wt % of Ta$_2$O$_5$,
1 wt % -15 wt % of ZnO,
and 0.1 wt % ~2 wt % of Li$_2$O.

2. The optical glass of claim 1 further comprising
0-8 wt % of ZrO$_2$,
0-5 wt % of Nb$_2$O$_5$,
0-5 wt % of Y$_2$O$_3$,
0-5 wt % of Yb$_2$O$_3$,
and at least one of BaO, CaO, SrO, Na$_2$O, K$_2$O and 0-0.5 wt % of Sb$_2$O$_3$, wherein, the total content of BaO, CaO and SrO is 0-15 wt %, and the total content of Na$_2$O and K$_2$O is 0-2 wt %.

3. The optical glass of claim 2 wherein the total content of BaO, CaO and SrO is 1 wt % -10 wt %, and the total content of Na$_2$O and K$_2$O is 0.1 wt % -1 wt %.

4. The optical glass of claim 2 wherein the total content of ZrO$_2$ is 1 wt % -7 wt %.

5. The optical glass of claim 1 comprising 0.1 wt % -3.5 wt % of SiO$_2$.

6. The optical glass of claim 1 comprising 22 wt % -32 wt % of B$_2$O$_3$.

7. The optical glass of claim 1 comprising 25 wt % -35 wt % of La$_2$O$_3$.

8. The optical glass of claim 1 comprising 18 wt % -25 wt % of Gd$_2$O$_3$.

9. The optical glass of claim 1 comprising 2 wt % -5 wt % of Ta$_2$O$_5$.

10. The optical glass of claim 1 comprising 5 wt % -12 wt % of ZnO.

11. The optical glass of claim 1 comprising 0.3 wt % -1.5 wt % of $Li_2O$.

12. The optical glass of claim 1 comprising 2.5 wt % -3.5 wt % of $SiO_2$.

13. The optical glass of claim 1 wherein
a refractive index is 1.75-1.8,
an Abbe number is 45-52,
a transformation temperature is less than 610° C., and
a corresponding wavelength is less than 390 nm at 80% transmittance.

14. An optical element comprising the optical glass of claim 1.

* * * * *